United States Patent
Torsner

(10) Patent No.: US 7,881,204 B2
(45) Date of Patent: Feb. 1, 2011

(54) MOBILE TELECOMMUNICATION

(75) Inventor: Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 971 days.

(21) Appl. No.: 11/579,790

(22) PCT Filed: May 7, 2004

(86) PCT No.: PCT/EP2004/050737

§ 371 (c)(1), (2), (4) Date: Nov. 7, 2006

(87) PCT Pub. No.: WO2005/109778

PCT Pub. Date: Nov. 17, 2005

(65) Prior Publication Data

US 2008/0192671 A1    Aug. 14, 2008

(51) Int. Cl.
H04L 1/00 (2006.01)
H04L 12/28 (2006.01)
H04L 12/56 (2006.01)

(52) U.S. Cl. ........................ 370/236; 370/389; 370/390; 370/394

(58) Field of Classification Search .................. 370/312, 370/389, 390, 392, 393, 394, 236
See application file for complete search history.

(56) References Cited

U.S. PATENT DOCUMENTS 7,318,187 B2 * 1/2008 Vayanos et al. ............. 714/776

2002/0041567 A1 * 4/2002 Yi et al. ..................... 370/236
2002/0071407 A1 * 6/2002 Koo et al. .................. 370/335

FOREIGN PATENT DOCUMENTS

EP    1 056 258    11/2000
EP    1056258    * 11/2000

OTHER PUBLICATIONS

International Search Report for PCT/EP2004/050737 dated Feb. 2, 2005.
"Universal Mobile Telecommunications System (UMTS); Radio Link Control (RLC) protocol specification (3GPP TS 25.322 version 5.7.0 Research 5); ETSI TS 125 322," ETSI Standards, No. V570, Dec. 2003, pp. 0-79, XP002313673.
Ericsson, Qualcomm Europe: "RLC size handling and RLC re-establishment, 25.322, V 5.7.0, v570, CR 257, 3GPP TSG-RAN2 Meeting 42," May 10, 2004-May 14, 2004, pp. 1-10, XP002313674.

* cited by examiner

Primary Examiner—Un C Cho
(74) Attorney, Agent, or Firm—Nixon & Vanderhye P.C.

(57) ABSTRACT

A node implementing an RLC (Radio Link Control) entity and being for use in a mobile communications system transmits a sequence of RLC SDUs (SDU=Service Data Unit) towards a peer node. As a result of re-establishment of an RLC entity not all SDUs may have been received. The peer notifies the node which is the next SDU that the peer expects to receive (by transmitting the next SDU number to the node). The node resumes transmission from that SDU onwards. This may or may not lead to re-transmission of SDUs transmitted before the RLC re-establishment. As an alternative, the peer does not notify the node of the next SDU that it expects to receive, but instead the node re-transmits any unacknowledged SDUs, together with the SDU number of the first re-transmitted SDU. The peer then discards any duplicate SDUs. Both variants enable lossless data transfer whilst avoiding duplication.

30 Claims, 1 Drawing Sheet

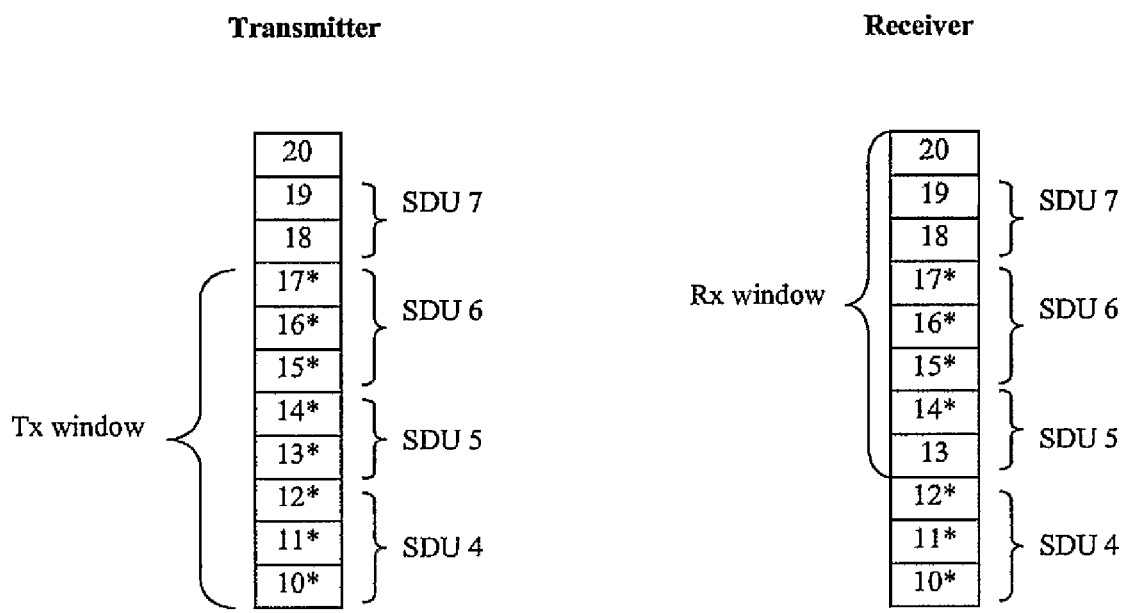

MOBILE TELECOMMUNICATION

This application is the US national phase of international application PCT/EP2004/050737 filed 7 May 2004, which designated the U.S., the entire content of which is hereby incorporated by reference.

The present invention relates to mobile telecommunication, in particular to RLC (Radio Link Control) Re-establishment, e.g. required due to an RLC PDU size change (RLC=Radio Link Control, PDU=Protocol Data Unit).

In the past, there has not been a particular need ever to change the PDU size. However, more recently a need for changing the PDU size has emerged. For example, the maximum throughput on HS-DSCH (High Speed-Downlink Shared Channel) is limited by the RLC PDU size. With larger PDU sizes on HS-DSCH the throughput can be increased. However, when switching to normal DCH (Dedicated Channel) or FACH (Forward Access Channel) the currently used RLC PDU size of 320 bits would preferably be used.

A similar situation may occur for the enhanced uplink, currently under development by 3GPP (The Third Generation Partnership Project), although in this case there is instead a desire to use a smaller PDU size than the standard 320 bit in order to have a larger coverage (the 320 bit RLC PDU gives a minimum data rate of 160 kbit/s with a 2 ms transmission time interval which is considered for the enhanced uplink, which may lead to insufficient coverage).

Hence a need has emerged to change the RLC PDU size for an ongoing connection, especially when switching between HS-DSCH, DCH (or FACH) and Enhanced Uplink Dedicated Channel.

According to 3GPP R-99/4/5, the RLC PDU size can be reconfigured for an ongoing connection, i.e. for an existing radio bearer. When the PDU size is reconfigured the RLC protocol is re-established.

The present inventor has appreciated that the procedures which are currently in use may lead to data loss.

When the RLC PDU size is reconfigured in R-99/4/5, an RLC entity (or RLC entities) in the UE (User Equipment, e.g. a mobile telephone) and the RNC (Radio Network Controller) is/are re-established since AM RLC (AM=Acknowledged Mode) can only have one PDU size at a given time. After the re-establishment the RLC sequence numbers start from zero.

The inventor has appreciated that a problem arises in connection with those RLC PDUs which have been transmitted before the re-establishment but have not yet been acknowledged. Since the transmitter has not yet received any ACK (Acknowledgement) for these PDUs it is not known if the SDUs contained in the PDUs have been received in the peer entity or not (SDU=Service Data Unit).

Regarding the relationship between SDUs and PDUs, it will be appreciated that the SDUs are received from higher layers. The size of the SDUs may vary, whereas the PDUs all have the same size (although the PDU size can be changed, but is then changed for all PDUs). The RLC segments and/or concatenates the SDUs into PDUs and it is the PDUs that are transmitted over the air, even if in the present specification reference is made to transmitted/received SDUs. An SDU can be regarded as transmitted/received if all PDUs containing segments of that SDU have been transmitted/received.

The transmitter could resegment the unacknowledged SDUs into new PDUs (with SNs (Sequence Numbers) starting from zero). This would mean that those SDUs which had, in fact, been received before the re-establishment (but not yet acknowledged) are received twice in the peer entity, thereby leading to duplicate reception of SDUs. Alternatively, the transmitter could discard the unacknowledged SDUs (on the assumption that they have, in fact, been received before the re-establishment) without re-transmitting them after the re-establishment. This would avoid any duplicate reception of SDUs but would instead lead to loss of data (in case not all unacknowledged SDUs were received before the re-establishment).

In other words, it has hitherto not been possible to guarantee both lossless data transfer and duplicate avoidance of SDUs at RLC re-establishment.

It is noted that in currently implemented systems any unacknowledged RLC PDUs in both the transmitter and the receiver are discarded at re-establishment, i.e. there is a risk of loss of data.

It is an aim of at least the preferred embodiments of the present invention to overcome this problem.

A first non-limiting aspect the present invention provides a method of operating a node implementing an RLC entity and being for use in a mobile communications system, the method comprising:
  transmitting a sequence of RLC SDUs towards a peer node; and
  as a result of re-establishment of an RLC entity:
    receiving from the peer node a request for re-transmission of at least one RLC SDU of said sequence; and
    re-transmitting said at least one RLC SDU of said sequence towards the peer node.

This first aspect is directed at the functionality of the node (e.g. an RNC or a UE) transmitting SDUs towards a peer node (e.g. the other of an RNC and a UTE), i.e. it primarily relates to the "transmitting end" of a node/peer node combination.

In preferred embodiments of this aspect the node receives from the peer node a request to re-transmit the first SDU which has not yet been received by the peer node, and the node then re-transmits this SDU and any subsequent SDUs.

In embodiments of the invention the peer node checks which SDU is the next one to be transmitted. It may be that all SDUs transmitted by the node have been received by the peer node, in which case there is no need for any retransmission. In this case the next SDU to be transmitted is an SDU which the node has not yet transmitted, so in this case transmission is simply resumed after the re-establishment (without re-transmission of SDUs). That is, when the node receives the request from the peer node for the next SDU the node checks if any SDUs already transmitted need to be re-transmitted.

In a second, non-limiting closely related aspect, the present invention provides a method of operating a node implementing an RLC entity and being for use in a mobile communications system, the method comprising:
  receiving, from a peer node, a sequence of RLC SDUs; and
  as a result of re-establishment of an RLC entity:
    requesting the peer node to re-transmit at least one RLC SDU of said sequence; and
    receiving, from the peer node, said at least one re-transmitted RLC SDU.

This second aspect is directed at the functionality of the node (e.g. an RNC or a UE) receiving SDUs from a peer node (e.g. the other of an RNC and a UE), i.e. it relates to the "receiving end" of a node/peer node combination and can hence be regarded as complementary to the first aspect.

In preferred embodiments of this aspect the node transmits to the peer node a request to re-transmit the first SDU which has not yet been received by the node, and the peer node then re-transmits this SDU and any subsequent SDUs.

The present invention also provides a combination of the first and second aspects, although it will be appreciated that the terms "node" and "peer node" would have to be swapped in one of the aspects. In other words, the combination describes the functionality of both the "transmitting end" and the "receiving end".

Whilst according to the first and second aspects a request for retransmission of one or more SDUs is transmitted/received, it is similarly possible for the "transmitting end" to re-transmit all unacknowledged SDUs and to let the "receiving end" know which SDUs are being re-transmitted. The "receiving end" can then identify any duplicate SDUs and discard these.

Hence, in a third non-limiting aspect closely related to the first and second aspects the present invention provides a method of operating a node implementing an RLC entity and being for use in a mobile communications system, the method comprising:

transmitting a sequence of RLC SDUs towards a peer node; and as a result of re-establishment of an RLC entity:
identifying at least one RLC SDU for which no acknowledgement has yet been received by the node;
re-transmitting said at least one RLC SDU towards the peer node; and
transmitting to the peer node an identification of the at least one RLC SDU which is being re-transmitted.

This third aspect is again directed at the functionality of the node (e.g. an RNC or a UE) transmitting SDUs towards a peer node (e.g. the other of an RNC and a UE), i.e. it primarily relates to the "transmitting end" of a node/peer node combination.

In preferred embodiments of this aspect the node identifies any unacknowledged SDUs and retransmits these. It also notifies the peer node which SDUs are being retransmitted so that the peer node can discard any duplicate SDUs.

In a fourth non-limiting aspect (which can be regarded as complementary to the third aspect), the present invention provides a method of operating a node implementing an RLC entity and being for use in a mobile communications system, the method, comprising:

receiving, from a peer node, a sequence of RLC SDUs; and
as a result of re-establishment of an RLC entity:
receiving, from the peer node, at least one re-transmitted RLC SDU of said sequence; and
receiving, from the peer node, an identification of the at least one RLC SDU which is being re-transmitted.

This fourth aspect is again directed at the functionality of the node (e.g. an RNC or a UE) receiving SDUs from a peer node (e.g. the other of an RNC and a UE), i.e. it relates to the "receiving end" of a node/peer node combination.

In preferred embodiments of this aspect the node receives from the peer node re-transmitted SDUs and an identification of the re-transmitted SDUs (which the peer node has identified as unacknowledged) so that the node can discard any duplicate SDUs.

The present invention also provides a combination of the third and fourth aspects, although it will be appreciated that the terms "node" and "peer node" would again have to be swapped in one of the aspects. In other words, also this combination describes the functionality of both the "transmitting end" and the "receiving end".

Preferred features are set out in the dependent claims. Apparatus aspects corresponding to method aspects disclosed herein are also provided, and vice versa.

Some preferred embodiments of the invention will now be described by way of example only and with reference to the accompanying drawing, in which:

The single FIGURE illustrates features of the method according to embodiments of the invention.

Pursuant to embodiments of the invention it is envisaged that the SDUs are numbered with sequence numbers (SDU numbers), preferably PDCP (Packet Data Convergence Protocol) sequence numbers. Both the transmitter and the receiver keep counters that are incremented for each transmitted and received SDU. Once the counters in the transmitter and receiver have been synchronised the sequence numbers do not need to be transmitted.

A first embodiment will now be described with reference to the FIGURE. We will first consider the case of downlink transmission, i.e. transmission of SDUs from an RNC to a UE. Hence the left part of the FIGURE shows SDUs (to be) transmitted by the RNC and the right part of the FIGURE shows SDUs (to be) received by the UE. The RNC numbers each transmitted SDU and the UE numbers each received SDU. These are shown in the FIGURE. Each numbered box in the FIGURE represents a PDU. In the example several PDUs are being grouped to form an SDU, but in practice a segment of an SDU, one complete SDU or several SDUs can be included into one PDU depending on the size of the SDU and the PDU. Boxes marked with an asterisk (*) represent PDUs which have been transmitted/received and boxes without asterisk represent PDUs which have not yet been transmitted/received. An SDU is considered to be transmitted (received) when all PDUs containing segments of the SDU have been received.

In the example, PDUs 10 to 17 have been transmitted. Out of the transmitted PDUs, PDU 13 has not been received. The transmitter has received acknowledgements for PDUs up to and including PDU 9. Since the receiver has received all PDUs containing segments of SDU 4 (PDU 10-12), SDU 4 has been delivered to higher layers.

We first consider the case of in-sequence-delivery by the receiver. Although SDU 6 has been received completely, it is not delivered to higher layers since SDU 5 has not yet been (completely) received.

When the RNC requests a re-establishment (e.g. required due to a PDU size change) it indicates to the UE from which SDU number it will start transmitting after the re-establishment. This can conveniently be done in a reconfiguration message, in particular an RRC (Radio Resource Control) reconfiguration message (e.g. RADIO BEARER RECONFIGURATION message). The message contains a SN set to 4 so as to indicate to the UE that SDU 4 is the first SDU that the RNC will transmit after the re-establishment.

If the SDU number contained in the message is lower than the number of an SDU which the UE has already received and delivered to higher layers the UE knows that a number of SDUs transmitted after the re-establishment are duplicates and should be ignored. In the example, after the re-establishment the RNC resegments SDUs 4 and onwards into PDUs with the new PDU size with RLC sequence numbers starting from zero. Since the UE knows that it has already received SDU 4 and delivered it to higher layers it can discard that SDU when it is received as a result of the re-transmission.

On the other hand, any SDUs received as a result of re-transmission and having a SN which is higher than the highest SDU number which has been delivered to higher layers will not be discarded. This is the case for SDU 5 and onwards. In this way both lossless data transfer and duplicate detection/duplicate avoidance can be achieved.

In a variant, if in-sequence-delivery is not configured, SDU 6 may also have been delivered to higher layers at the time of re-establishment since it has been completely received. In this case, the UE would also discard this SDU upon reception after the re-establishment. To enable UE to do this it is provided with a memory facility which stores the numbers of SDUs which have (recently) been delivered to higher layers.

In the uplink case the function is similar to that of the downlink case: The UE includes in a reconfiguration complete message (RRC reconfiguration complete message, e.g. RADIO BEARER RECONFIGURATION COMPLETE message) the SDU number of that SDU from which (re-)transmission after the re-establishment will start, and corresponding steps as in the downlink case are performed.

It is noted that without the invention, the UE would not know that SDU 4 transmitted after the re-establishment is a copy of an already received SDU and would therefore deliver it twice to higher layers.

A second embodiment will now be described, still with reference to the FIGURE. Whilst in the first embodiment the transmitter re-transmits any unacknowledged SDUs and sends the SDU number of the first SDU that it re-transmits (SDU 4 in the example), it is possible, according to the second embodiment, for the receiver to indicate to the transmitter from which SDU onwards the (re-)transmission should start. The receiver would check if all SDUs up to the SDU with the highest SDU number have been received. If not all SDUs up to and including the highest-numbered SDU have been received then the receiver would request transmission from the lowest-numbered non-received SDU onwards. In the example, the receiver would indicate to the transmitter that the transmitter should transmit from SDU 5 onwards. This indication could be included in the reconfiguration complete message for the downlink case (the RNC being the transmitter, the UE being the receiver) and in the reconfiguration message for the uplink case (the UE being the transmitter, the RNC being the receiver).

If on the other hand SDU 5 had also been received by the UE the UE would request transmission to start from SDU 7 onwards, so in this case there would be no re-transmission.

In other words, in this embodiment the receiver indicates to the transmitter the first SDU that the receiver expects to receive after the re-establishment. The transmitter then resumes transmission after the re-establishment from that SDU onwards. This may or may not lead to re-transmission of any SDUs already transmitted.

Pursuant to both embodiments it is possible to change the RLC PDU size (or make RLC re-establishments for other reasons, e.g. as a consequence of an RLC protocol error such as an RLC unrecoverable error) while maintaining both lossless data transfer and duplication avoidance.

It is noted that the above embodiments relate to processes which take place between an RNC and a UE associated with that RNC, i.e. processes which are controlled by a single RNC.

It is also noted that references to "re-establishment of an RLC entity" do not necessarily mean that the complete RLC entity has to be re-established. It is possible e.g. to change the PDU size only for the downlink, in which case it would be possible only to re-establish the transmitter side of the RNC and the receiver side of the UE.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A node implementing an RLC (Radio Link Control) entity and being for use in a mobile communications system, the node comprising:
    means for transmitting a sequence of RLC SDUs (RLC =Radio Link Control, SDU =Service Data Unit) towards a peer node;
    wherein the node is arranged, as a result of re-establishment of an RLC entity, to:
        receive from the peer node a request for re-transmission of at least one RLC SDU of said sequence, said request comprising an SDU sequence number of said at least one RLC SDU of said sequence; and
        re-transmit said at least one RLC SDU of said sequence towards the peer node.

2. The node according to claim 1, wherein the RLC re-establishment is required due to an RLC PDU (RLC =Radio Link Control, PDU =Protocol Data Unit) size change.

3. The node according to claim 1, wherein the RLC re-establishment is required due to an RLC protocol error.

4. The node according to claim 1, wherein the node is arranged to identify, based on said SDU sequence number, which RLC SDU(s) need(s) to be re-transmitted.

5. The node according to claim 1, wherein the node is arranged to re-transmit all RLC SDUs subsequent to, and including, that RLC SDU whose SDU sequence number is comprised in said request.

6. The node according to claim 1, wherein the node comprises an RNC (Radio Network Controller) and the peer node comprises a UE (User Equipment).

7. The node according to claim 6, wherein said request is arranged to be received in a RRC (Radio Resource Control) reconfiguration complete message.

8. The node according to claim 1, wherein the node comprises a UE and the peer node comprises an RNC.

9. The node according to claim 8, wherein said request is arranged to be received in a RRC reconfiguration message.

10. A node implementing an RLC entity and being for use in a mobile communications system, the node comprising:
    means for receiving, from a peer node, a sequence of RLC SDUs;
    wherein the node is arranged, as a result of re-establishment of an RLC entity, to:
        request the peer node to re-transmit at least one RLC SDU of said sequence, said request comprising an SDU sequence number of said at least one RLC SDU of said sequence; and
        receive, from the peer node, said at least one re-transmitted RLC SDU.

11. The node according to claim 10, further comprising means for determining a first RLC SDU of said sequence which has not yet been received,
    wherein the node is arranged to request the peer node to re-transmit the first RLC SDU of said sequence which has not yet been received.

12. A-The node according to claim 10, further comprising means for discarding those of the re-transmitted RLC SDUs which had already been received before the re-transmittal.

13. The node according to claim 10, further comprising means for discarding those of the re-transmitted RLC SDUs which had already been delivered to higher layers.

14. The node according to claim 10, wherein the node is arranged to transmit said request in a RRC reconfiguration message.

15. The node according to claim 10, wherein the node is arranged to transmit said request in a RRC reconfiguration complete message.

16. A system comprising:
the node according to claim 1; and
said peer node, wherein said peer node implements an RLC entity and is for use in the mobile communications system, the peer node comprising means for receiving, from the node, the sequence of RLC SDUs;
wherein the peer node is arranged, as a result of said re-establishment, to:
request the node to re-transmit said at least one RLC SDU of said sequence, said request comprising an SDU sequence number of said at least one RLC SDU of said sequence; and
receive, from the node, said at least one re-transmitted RLC SDU.

17. A node implementing an RLC entity and being for use in a mobile communications system, the node comprising:
means for transmitting a sequence of RLC SDUs towards a peer node;
wherein the node is arranged, as a result of re-establishment of an RLC entity, to:
identify at least one RLC SDU for which no acknowledgement has yet been received by the node;
re-transmit said at least one RLC SDU towards the peer node; and
transmit to the peer node an identification of the at least one RLC SDU which is being re-transmitted, said identification comprising an SDU sequence number of said at least one RLC SDU.

18. The node according to claim 17, wherein the peer node can determine, using the SDU sequence numbers, whether said at least one re-transmitted RLC SDU had already been received by the receiver as a result of the transmission of the sequence of RLC SDUs.

19. The node according to claim 17, wherein said identification comprises the SDU sequence number of a first re-transmitted RLC SDU.

20. The node according to claim 17, wherein said identification is transmitted in a RRC reconfiguration message.

21. The node according to claim 17, wherein the node is arranged to transmit said identification in a RRC reconfiguration complete message.

22. A node implementing an RLC entity and being for use in a mobile communications system, the node comprising:
means for receiving, from a peer node, a sequence of RLC SDUs;
wherein the node is arranged, as a result of re-establishment of an RLC entity, to:
receive, from the peer node, at least one re-transmitted RLC SDU of said sequence; and
receive, from the peer node, an identification of the at least one RLC SDU which is being re-transmitted, said identification comprising an SDU sequence number of said at least one RLC SDU.

23. The node according to claim 22, further comprising means for determining, using the SDU sequence numbers, whether said at least one re-transmitted RLC SDU had already been received by the node as a result of the transmission of the sequence of RLC SDUs.

24. The node according to claim 22, wherein said identification is arranged to be received in a RRC reconfiguration complete message.

25. The node according to claim 22, wherein said identification is arranged to be received in a RRC reconfiguration message.

26. A system comprising:
the node according to claim 17; and
said peer node, wherein said peer node implements an RLC entity and is for use in the mobile communications system, the peer node comprising
means for receiving, from the node, said sequence of RLC SDUs;
wherein the peer node is arranged, as a result of said re-establishment, to:
receive, from the node, said at least one re-transmitted RLC SDU of said sequence; and
receive, from the node, said identification of said at least one RLC SDU which is being re-transmitted, said identification comprising an SDU sequence number of said at least one RLC SDU.

27. A method of operating a node implementing an RLC (Radio Link Control) entity and being for use in a mobile communications system, the method comprising:
transmitting a sequence of RLC SDUs (RLC =Radio Link Control, SDU =Service Data Unit) towards a peer node; and
as a result of re-establishment of an RLC entity:
receiving from the peer node a request for re-transmission of at least one RLC SDU of said sequence, said request comprising an SDU sequence number of said at least one RLC SDU of said sequence; and
re-transmitting said at least one RLC SDU of said sequence towards the peer node.

28. A method of operating a node implementing an RLC entity and being for use in a mobile communications system, the method comprising:
receiving, from a peer node, a sequence of RLC SDUs; and
as a result of re-establishment of an RLC entity:
requesting the peer node to re-transmit at least one RLC SDU of said sequence, said request comprising an SDU sequence number of said at least one RLC SDU of said sequence; and
receiving, from the peer node, said at least one re-transmitted RLC SDU.

29. A method of operating a node implementing an RLC entity and being for use in a mobile communications system, the method comprising:
transmitting a sequence of RLC SDUs towards a peer node; and
as a result of re-establishment of an RLC entity:
identifying at least one RLC SDU for which no acknowledgement has yet been received by the node;
re-transmitting said at least one RLC SDU towards the peer node; and
transmitting to the peer node an identification of the at least one RLC SDU which is being re-transmitted, said identification comprising an SDU sequence number of said at least one RLC SDU.

30. A method of operating a node implementing an RLC entity and being for use in a mobile communications system, the method, comprising:
receiving, from a peer node, a sequence of RLC SDU s; and
as a result of re-establishment of an RLC entity:
receiving, from the peer node, at least one re-transmitted RLC SDU of said sequence; and
receiving, from the peer node, an identification of the at least one RLC SDU which is being re-transmitted, said identification comprising an SDU sequence number of said at least one RLC SDU.

* * * * *